United States Patent [19]

Erlichman

[11] 4,201,457
[45] May 6, 1980

[54] PHOTOGRAPHIC FILM ASSEMBLAGE HAVING INTERCONNECTED FILM UNITS

[75] Inventor: Irving Erlichman, Wayland, Mass.

[73] Assignee: Polaroid Corporation, Cambridge, Mass.

[21] Appl. No.: 974,360

[22] Filed: Dec. 29, 1978

[51] Int. Cl.$^2$ .................... G03B 17/52; G03B 1/02
[52] U.S. Cl. ................................. 354/86; 354/212; 430/496
[58] Field of Search ............... 354/86, 212; 96/201, 96/76 C

[56] References Cited

U.S. PATENT DOCUMENTS

| | | | |
|---|---|---|---|
| 2,458,186 | 7/1947 | Messina et al. | 354/87 |
| 2,946,270 | 7/1960 | Eloranta | 354/84 |
| 3,550,515 | 12/1970 | Erlichmann | 354/173 |
| 3,582,335 | 6/1971 | Erlichman | 430/207 |
| 3,636,845 | 1/1972 | Harvey | 430/210 |
| 3,754,917 | 8/1973 | Harvey | 96/76 C |
| 3,963,496 | 6/1976 | Arisaka | 96/201 |

Primary Examiner—L. T. Hix
Assistant Examiner—Shelley Wade
Attorney, Agent, or Firm—Alfred E. Corrigan

[57] ABSTRACT

A film assemblage including a cassette, a plurality of film units of the self-developing type, a leader formed from an elongate strip of opaque material and a reel upon which the leader is adapted to be wound as the film units are manually withdrawn from the cassette. The leader is releasably connected to each film unit via a pull tab located near one end of each film unit. When the assemblage is located within a camera, the reel is manually rotated until a portion of the leader is removed from covering relationship with a film unit and the tab of that film unit extends between a pair of rollers to the exterior of the camera. The film unit is then exposed and the tab is manually pulled to draw the exposed film unit between the rollers for processing. Movement of the film unit through the rollers is effective to rotate the reel to thereby wind the leader thereupon until the tab of the next film unit to be exposed protrudes to the exterior of the camera.

5 Claims, 3 Drawing Figures

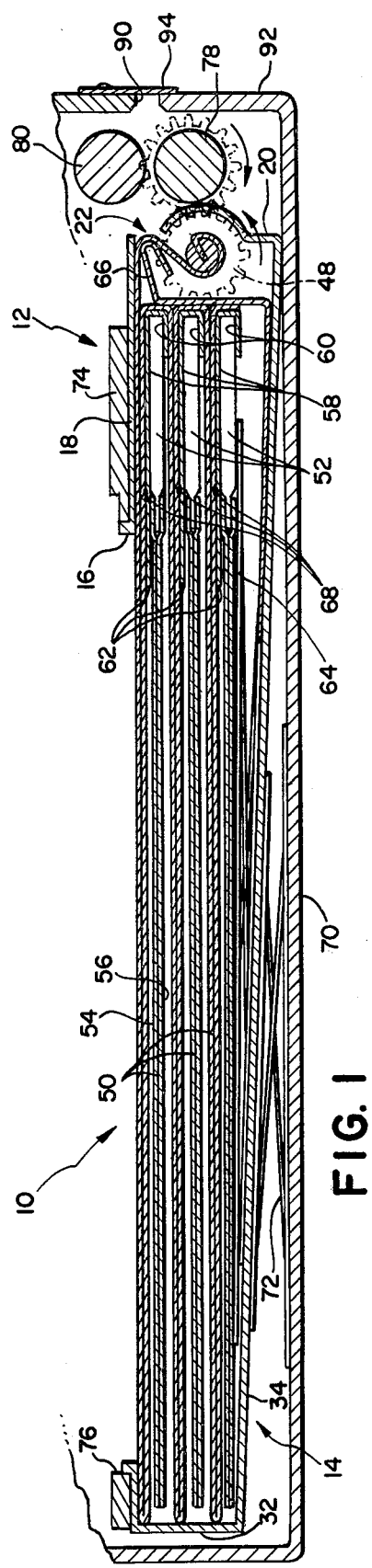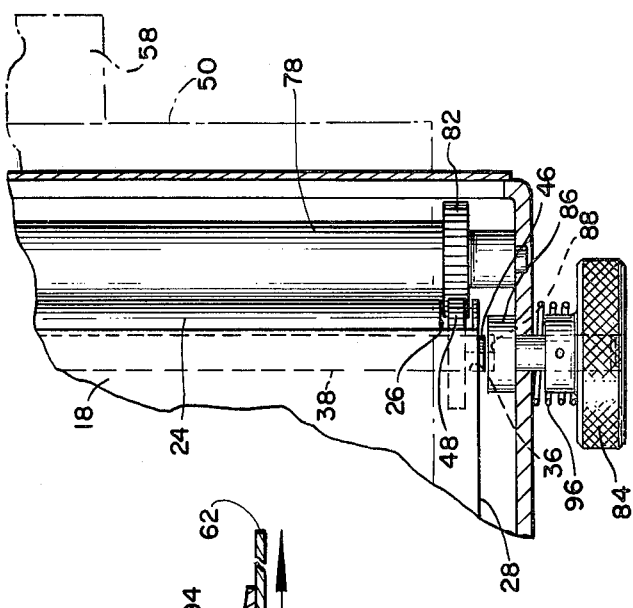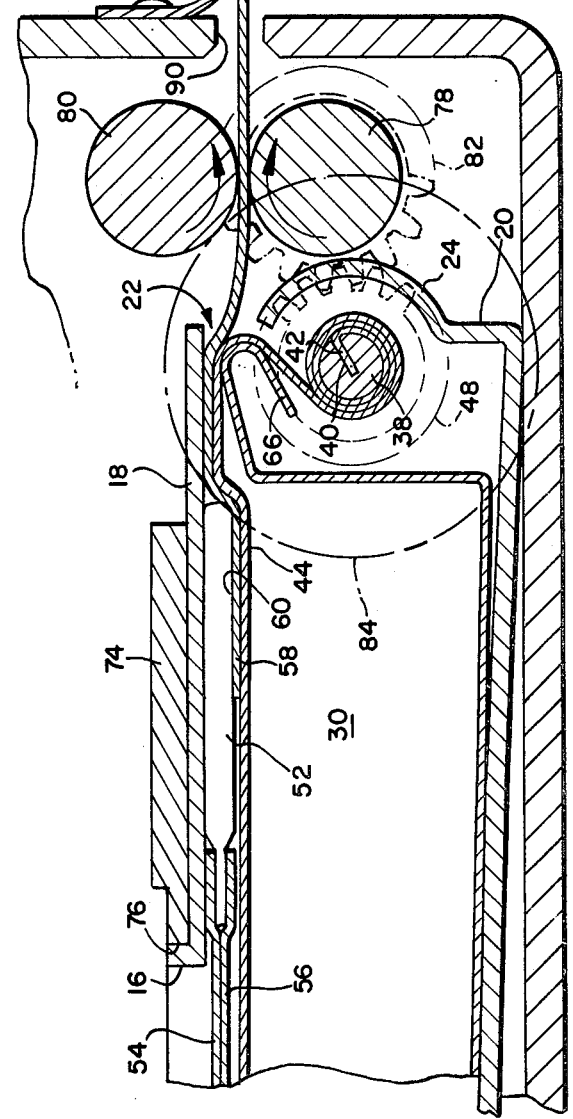

PHOTOGRAPHIC FILM ASSEMBLAGE HAVING INTERCONNECTED FILM UNITS

BACKGROUND OF THE INVENTION

1. Field of the Invention

This invention relates to a photographic film assemblage of the self-developing type including a film cassette containing a plurality of film units interconnected by a common leader or strip.

2. Description of the Prior Art

It is well known in the photographic arts to provide a film assemblage wherein a plurality of self-developing type film units are interconnected by a carrier sheet or leader which functions to lead the film units to a predetermined location. For example, see U.S. Pat. Nos. 3,582,335, 2,458,186, and 3,636,845. However, the film assemblage described in the U.S. Pat. No. 3,582,335 leaves something to be desired in that its leader extends to the exterior of the camera and must be discarded after use. The U.S. Pat. No. 2,458,186 describes a camera having a reel upon which the leader is wound during the advancement of each film unit. After the exposure of all of the film units, the leader must be removed from the reel before another film assemblage can be loaded into the camera. The U.S. Pat. No. 3,636,845 discloses a film assemblage including a film cassette containing a plurality of self-developing type film units which are interconnected by a continuous leader. One end of the leader is wound upon a reel located within the film cassette during the sequential movement of each film unit to the exterior of the camera. It is also well known to provide each of the film units with an individual leader or tab which is adapted to be moved to the exterior of a camera by a knob actuatable tab advancer, as shown in U.S. Pat. No. 2,946,270. Further, as shown in U.S. Pat. No. 3,550,515, it is known to provide a film cassette with a gear driven roller which is adapted to drive a continuous web for sequentially advancing film units into the bite of a pair of motor driven spread rollers. However, the prior art fails to show a film assemblage wherein a film cassette is provided with a spread roller driven reel for taking up a leader as film units are being manually pulled through a pair of spread rollers.

SUMMARY OF THE INVENTION

The instant invention relates to a photographic film assemblage including a film cassette for housing a plurality of film units of the self-developing type. Each of the film units is provided with a tab which is detachably connected to an elongate strip of opaque material, hereinafter referred to as a leader. A leader take-up reel is rotatably mounted within the film cassette. The take-up reel includes a shaft on which a gear is fixedly secured. The leader has one of its ends attached to the reel and extends therefrom across the first film unit to be exposed and back under itself into engagement with a tab secured to the first film unit. The width of the leader is at least equal to the width of the film unit thereby initially serving as a cover sheet to prevent premature exposure of the film units in the film cassette during the loading of the latter into a camera. The leader extends from its connection with the tab on the first film unit to be exposed between the first and second film units to be exposed and back under itself into engagement with the tab on the second film unit. This interpositioning of the leader continues until the leader terminates at its connection with the tab on the last film unit to be exposed.

The film assemblage of the instant invention is specifically adapted for use in a camera of the type having a pair of elongate, superposed rollers, at least one of which has a gear fixedly attached to one end, and a tab advancing member. When the film assemblage is loaded into the camera, the gear on the end of the roller is in mesh with the gear on the shaft of the reel and the tab advancing member is located adjacent a side of the film cassette. So located, the operator manually presses the tab advancing member inwardly until it engages an end of the shaft which extends through a wall of the cassette. Once engaged, the operator turns the advancing member thereby rotating the reel and the elongate roller via its connection to the gear on the shaft of the reel. The rotation of the reel results in a portion of the leader being wound upon the reel thereby uncovering the endmost or first film unit in the film cassette for exposure. As the first film unit is being uncovered, the leader, via its detachable connection to the tab on the film unit, folds the tab back upon itself until its free end faces the egress opening in the film cassette. Continued rotation of the reel results in the free end of the tab moving through the egress opening and into the bite of the camera's rollers. As the tab is about to move through the egress opening, the path of movement of the leader relative to that of the tab diverges thereby facilitating the detachment of the leader from the tab. The rollers continue the advancement of the tab to the exterior of the camera. When the operator sees the protruding tab he releases the tab advancing member thereby stopping the advancement of the tab. After the first film unit has been exposed, the tab is manually grasped and pulled to draw the exposed film unit from the film cassette and through the rollers. As is well known in the art, the rollers rupture a container of processing liquid attached to the leading end of the exposed film unit and spread its contents between layers of the film unit to initiate the formation of a visible image therein. As the film unit is being pulled through the rollers it imparts rotation thereto which in turn is transmitted to the reel via the engagement between the gear on the roller and the gear on the reel's shaft. Rotation of the reel is now effective to wind the portion of the leader extending between the first and second film units upon the reel thereby uncovering the second film unit in preparation for its exposure. During the latter stages of the uncovering of the second film unit, the leader folds the tab on the second film unit back upon itself until its free end extends through the egress opening in the cassette and toward the bite of the rollers where it is in position to be moved into the bite upon the next rotation of the tab advancing member.

An object of the invention is to provide a photographic film assemblage wherein a plurality of the film units of the self-developing type are interconnected by a common leader which is adapted to be wound upon a reel located in a film cassette as the leader sequentially moves the film units from the film cassette.

Another object of the invention is to provide a photographic film assemblage of the type described with a take-up reel which may be driven in response to drawing an exposed film unit between a pair of elongate spread rollers.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawing wherein:

FIG. 1 is a side elevational view of the photographic film assemblage of the instant invention located within a camera;

FIG. 2 is an enlarged side view of a portion of FIG. 1 with certain parts omitted for clarity; and FIG. 3 is a plan view of a film tab advancing member.

DETAILED DESCRIPTION OF THE INVENTION

Reference is now made to FIG. 1 of the drawing wherein is shown a photographic film assemblage 10 mounted in a camera 12 of the self-developing type. The photographic film assemblage 10 includes a generally parallelepiped shaped film cassette 14 having a generally rectangularly shaped exposure opening 16 in a forward wall 18 thereof and a leading end wall 20 having an egress opening 22 therein which extends across substantially the entire width of the film cassette 14. The leading end wall 20 is outwardly bowed at 24 and is provided at one end thereof with a vertically oriented slot 26, i.e., the slot 26 is perpendicular to the egress opening 22. A pair of side walls 28 and 30 extend rearwardly from the leading end wall 20 to a point where they integrally join a trailing end wall 32. The lower surfaces of each of the walls 20, 28, 30 and 32 are joined to each other by a rear wall 34. Each of the side walls 28 and 30 is provided with an opening 36 (only one being shown) for rotatably receiving the ends of a shaft 38 which functions as a take-up reel. The shaft 38 is slotted at 40 so as to receive one end 42 of a leader 44; and the right hand side 46 of the shaft 38 (see FIG. 3) is provided with a square cross sectional configuration. A gear 48 is fixedly attached to the right hand end of the shaft such that a portion of its peripheral surface extends the slot 26 in the leading end wall 20 of the film cassette.

A plurality of film units 50 are stacked within the film cassette 14 with an endmost film unit located adjacent the forward wall 18 with its photosensitive area located in alignment with the exposure opening 16. A container or pod 52 of processing liquid is attached to the leading end of each of the film units in position to release its contents between layers 54 and 56 of each film unit upon the application of a compressive force to the pod 52. Each film unit 50 is provided with an elongate tab 58 having a first end fixedly secured at 60 to the underside of each pod 52. Each of the tabs 58 extends forwardly from its securement at 60 to the leading end of each film unit, around the leading end, and then back toward the trailing end (to the left as viewed in FIG. 1) of each film unit where it terminates in a second end 62. A spring biased platen 64 is positioned between the lowermost film unit 50 in the stack and the rear wall 34 of the film cassette 14 for resiliently urging the endmost or uppermost film unit into engagement with the forward wall 18 such that the leading end of the film unit containing the pod 52 is located in alignment with the egress opening 22. The platen 64 includes a resilient guide 66 which extends across substantially the entire width of the film cassette 14.

As mentioned above, the photographic film assemblage 10 includes an elongate leader 44. The leader 44 is secured at one end 42 within the slot 40 in the take-up reel 38 and extends therefrom around the guide 66 and between the endmost or uppermost film unit 50 and the forward wall 18 to a position adjacent the trailing end wall 32 of the film cassette 14. From there, the leader is folded under itself and extends back toward the leading end of the uppermost film unit 50 to a point 68 where it is releasably secured by any suitable means to the tab 58 on the endmost film unit. So located, this folded portion of the leader 44 functions as a dark slide or cover sheet for preventing premature exposure of the film units during loading of the film assemblage 10 into the camera 12. From its releasable attachment at 68 to the tab 58 on the endmost film unit, the leader 44 extends forwardly to the leading edge of the film unit and then wraps around the leading end and runs between the endmost film unit and the next adjacent film unit to a position adjacent the trailing end wall 32 where it is again folded under itself so as to extend forwardly to its releasable attachment at 68 to the tab 58 on the next adjacent film unit 50. This latter double fold of the leader 44 which is positioned between the endmost film unit and the next adjacent film unit functions to prevent premature exposure of the next adjacent film unit in those cases where the film units 50 may be of the self-developing transparency type, i.e., the photographic exposure of the overlying film unit by the camera's lens and shutter assembly will not prematurely expose or fog the underlying film unit. The leader 44 continues this back and forth movement until it terminates shortly after its releasable connection at 68 to the tab 58 on the bottom film unit.

The photographic film assemblage 10 is adapted to be positioned within the camera 12 as shown in FIG. 1. A bottom wall 70 of the camera is provided with a spring 72 for biasing the film cassette 14 upwardly such that its forward wall is maintained in engagement with a support plate 74 having an exposure opening 76 therein. A pair of elongate spread rollers 70 and 80 are suitably mounted for rotation adjacent the leading end wall 20 of the film cassette 14. The right hand end (see FIG. 3) of the roller 78 is provided with a gear 82 which is in mesh with the gear 48 when the film cassette is properly located within the camera.

After the film cassette 14 has been positioned as shown in FIG. 1, the uppermost film unit 50 in the stack is prepared for exposure by uncovering its photosensitive area. This is accomplished by the operator pushing a spring biased knob 84 inwardly so as to move a female coupling 86 having a square shaped recess 88 into operative relation with the square end 46 of the shaft 38. The operator rotates the knob in a counterclockwise direction thereby rotating the shaft or reel 38 in a similar direction while simultaneously rotating the roller 78 in an opposite direction. As the reel 38 rotates as described, it winds the leader 44 thereupon as it removes the portion of the leader 44 from between its forward wall 18 and the uppermost film unit. Rotation of the knob is continued until the slack in said portion has been taken up to the leader's point of attachment 68 to the tab 58 on the uppermost film unit 50. Further winding of the leader 44 onto the reel 38 results in the tab 58 being folded over upon itself until its second end 62 extends toward the egress opening 22. The tab 58 is formed from a resilient material, e.g., Mylar, which tends to return to its original configuration when not under any force. Accordingly, as the leader 44 is being drawn over the guide 66 and downwardly onto the reel 38, the tab 58 continues in a straight line through the egress opening 22 and into the bite of the rollers 78 and 80 which continue its advancement into an exit slot 90 in a leading end wall 92 of the camera wherein it deflects a light shield 94 and protrudes to the exterior of the camera. The detachment of the leader 44 from the tab 58 at point 68 is facilitated by the guide 66 directing the leader 44 sharply away from the tab 58. When the operator sees the tab protrude through the exit slot 90 he releases the knob 84 which then moves back to an inoperative position under the influence of a spring 96.

After the exposure of the endmost film unit, the protruding tab 58 is manually grasped by the operator to draw the exposed film unit through the rollers 78 and 80. As the exposed film unit 50 is drawn between the rollers 78 and 80 the pod 52 is ruptured and its contents spread between the layers 54 and 56 to initiate the formation of a visible image within the film unit. Simultaneous therewith, this movement of the film unit is imparted to the roller 78 to drive it and its gear 82 in a clockwise direction thereby rotating the reel 38 in a counterclockwise direction. This latter rotation of the reel 38 is effective to wind a further portion of the leader 44 thereupon while simultaneously uncovering the next adjacent film unit 50 for exposure. When the exposed film unit has been moved out of engagement with the rollers 78 and 80, the gears 82 and 48 have driven the reel 38 through enough revolutions to completely uncover the next adjacent film unit and to take up the slack in the leader to the point where the second end 62 of the tab 58 is protruding through the egress opening and the leader 44 is no longer attached at 68 to the tab 58. After the exposure of the next adjacent film unit 50, which is now the endmost or uppermost film unit in the stack, the knob 84 is again pressed inwardly and rotated in a counterclockwise direction until the tab 58 protrudes through the next slot 90. The tab 58 is then manually grasped and pulled to draw the exposed film unit through the rollers thereby processing the film unit while simultaneously uncovering the next underlying film unit for exposure and directing the second end 62 of its tab 58 toward the rollers.

Although the length of the portion of the leader extending between each film unit has been shown to be the same, it is to be understood that in practice there would preferably be increasing lengths located between succeeding film units in order to compensate for the increasing diameter of the portion of the leader 44 wound upon the reel 38.

Since certain changes may be made in the above described invention without departing from the scope thereof, it is intended that all matters continued in the above description or shown in the accompanying drawing shall be interpreted as illustrative and not in a limiting sense.

What is claimed is:

1. A photographic film assemblage for use with a camera of the self-developing type including a pair of elongate rollers, at least one of which includes a gear at one end thereof, and an exit opening through which a film unit may be moved to the exterior of the camera, said photographic film assemblage comprising:
    a film cassette having an exposure opening through which a film unit is adapted to be exposed, an egress opening through which a film unit is adapted to be moved subsequent to exposure, and a slot through which a portion of a gear is adapted to extend;
    a plurality of self-developing type film units oriented in a stack within said film cassette with an endmost film unit having its photosensitive layer located in alignment with said exposure opening and a leading end thereof carrying a rupturable container of processing liquid located in alignment with said egress opening;
    means for resiliently biasing said film units toward said exposure opening;
    an elongate tab secured to each of said film units, each of said tabs includes a first end secured to said leading end of each of said film units, and a second unattached end;
    means for connecting said tab on one of said film units to the tab on the next adjacent film unit, said connecting means comprising a strip of flexible sheet material having one end thereof fixedly secured to a take-up reel and extending therefrom into detachable connection with each of said tabs;
    a take-up reel including a shaft rotatably mounted within said film cassette for winding said strip thereupon as said film units are moved through said egress opening; and
    a gear fixedly attached to said shaft such that a portion thereof extends through said slot in said film cassette where it is adapted to be meshed with the gear on the elongate roller of the camera, whereby rotation of said shaft by an exteriorly applied manual force is effective to rotate the elongate roller and to wind a portion of said strip upon said take-up reel while simultaneously moving said second end of said tab on said endmost film unit through said egress opening and into the bite of the elongate rollers which continue the advancement of said second end of said tab through the exit opening in the camera to a position whereat it may be manually grasped and pulled, subsequent to the exposure of said endmost film unit, to draw said endmost film unit through the elongate rollers while simultaneously moving said tab on the next adjacent film unit toward the bite of the rollers.

2. A photographic film assemblage as defined in claim 1 wherein said strip is formed from an opaque material and is dimensioned so as to originally overlie said endmost film unit to preclude premature exposure thereof during the loading of said film assemblage into the camera.

3. A photographic film assemblage as defined in claim 2 wherein said strip originally overlies each of said film units such that when said take-up reel is rotated to remove a section of said strip from its overlying relation with said endmost film unit in preparation for exposure thereof the remainder of said strip maintains its overlying relation with respect to the remaining film units.

4. A photographic film assemblage as defined in claim 1 wherein the elongate roller and its gear transmit a portion of the manual force used to pull said endmost film unit through the elongate rollers to said gear on said shaft to rotate the latter and said take-up thereby winding a further portion of said strip upon said take-up reel.

5. A photographic film assemblage as defined in claim 1 further including means for facilitating the detachment of said strip from said tab on said endmost film unit as said tab is about to pass through said egress opening in said film cassette.

* * * * *